United States Patent
Doan et al.

(10) Patent No.: US 11,976,239 B2
(45) Date of Patent: *May 7, 2024

(54) METHOD OF REMOVING NON-AQUEOUS DRILLING MUD WITH BANANA CONTAINING FLUID

(71) Applicant: Baker Hughes Oilfield Operations LLC, Houston, TX (US)

(72) Inventors: Angela Anh Doan, Spring, TX (US); Violeta Ramos-Edwards, Houston, TX (US); Andrew Christopher Holley, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/980,972

(22) Filed: Nov. 4, 2022

(65) Prior Publication Data

US 2023/0110987 A1    Apr. 13, 2023

Related U.S. Application Data

(63) Continuation-in-part of application No. 17/011,787, filed on Sep. 3, 2020, now Pat. No. 11,492,873.

(51) Int. Cl.
*C09K 8/52* (2006.01)
*C09K 8/524* (2006.01)
*C09K 8/528* (2006.01)
*E21B 37/06* (2006.01)

(52) U.S. Cl.
CPC .............. *C09K 8/524* (2013.01); *C09K 8/528* (2013.01); *E21B 37/06* (2013.01); *C09K 2208/04* (2013.01)

(58) Field of Classification Search
CPC .... C09K 8/524; C09K 8/528; C09K 2208/04; E21B 37/06
See application file for complete search history.

(56) References Cited

U.S. PATENT DOCUMENTS

| 4,559,149 | A | 12/1985 | Shell |
| 6,672,388 | B2 | 1/2004 | McGregor et al. |
| 7,392,845 | B2 | 7/2008 | Berry et al. |
| 7,481,273 | B2 | 1/2009 | Javora et al. |
| 9,453,156 | B2 | 9/2016 | Wu |
| 10,767,098 | B2 | 9/2020 | Doan et al. |
| 11,429,873 | B2 * | 8/2022 | Kate ................ G06N 5/02 |
| 11,492,873 | B2 | 11/2022 | Doan et al. |

(Continued)

FOREIGN PATENT DOCUMENTS

| CN | 108842757 A | * 11/2018 | ............ E02D 5/34 |
| CN | 112063374 A | * 12/2020 | |

(Continued)

OTHER PUBLICATIONS

Translation CN-112063374-A (Year: 2020).*

(Continued)

*Primary Examiner* — Angela M DiTrani Leff
(74) *Attorney, Agent, or Firm* — John Wilson Jones; Jones Delflache LLP

(57) ABSTRACT

Non-aqueous drilling fluids may be removed from a wellbore or tubing nor casing within the wellbore by introducing into the well a biodegradable aqueous fluid comprising banana.

20 Claims, 2 Drawing Sheets

Whole banana

(56) References Cited

U.S. PATENT DOCUMENTS

| | | | |
|---|---|---|---|
| 2004/0132626 A1* | 7/2004 | Guzman | C09K 8/08 |
| | | | 507/104 |
| 2008/0274918 A1 | 11/2008 | Quintero et al. | |
| 2010/0010282 A1* | 1/2010 | Acosta Estrada | C10G 29/02 |
| | | | 208/46 |
| 2010/0292107 A1 | 11/2010 | Rayborn, Sr. et al. | |
| 2012/0055852 A1 | 3/2012 | Soane et al. | |
| 2012/0305250 A1 | 12/2012 | Burts, Jr. et al. | |
| 2012/0322695 A1 | 12/2012 | Kefi et al. | |
| 2018/0230360 A1 | 8/2018 | Walker et al. | |
| 2019/0093001 A1 | 3/2019 | Merli et al. | |
| 2019/0226623 A1 | 7/2019 | Perstnev et al. | |
| 2019/0322695 A1 | 10/2019 | Birkus et al. | |
| 2020/0399526 A1* | 12/2020 | Farmer | C12P 39/00 |
| 2022/0251437 A1* | 8/2022 | Vasshus | C09K 8/516 |

FOREIGN PATENT DOCUMENTS

| | | |
|---|---|---|
| CN | 112063374 A | 12/2020 |
| ES | 2701454 T3 | 2/2019 |
| ES | 2701454 T3 | 2/2019 |
| WO | WO 2011/109598 A1 | 9/2011 |
| WO | WO2011109598 A1 | 9/2011 |
| WO | WO216039759 A1 | 3/2016 |
| WO | WO 2016039759 A1 | 3/2016 |
| WO | WO2016048349 A1 | 3/2016 |
| WO | WO 2016048349 A1 | 3/2016 |
| WO | WO2019204715 A1 | 10/2019 |
| WO | WO 20190204715 A1 | 10/2019 |
| WO | WO 2020/051204 A1 | 3/2020 |
| WO | WO 20200051204 A1 | 3/2020 |

OTHER PUBLICATIONS

Translation CN-108842757-A (Year: 2018).*
A.T. Al-Hameedi, et al., "Proposing a new biodegradable thinner and fluid loss control agent for water-based drilling fluid applications", International Journal of Environmental Science and Technology, Jan. 29, 2020, vol. 17, No. 8, pp. 3621-3632.
PCT International Search Report and Written Opinion, PCT/US2021/047509, dated Dec. 23, 2021.
Bakar, Green Lost Circulation Material Derived from Orange Peel Waste, Jan. 2011, Universiti Teknologi Petronas, 2011.
Translation of ES 2701454-T3 (Year:2019).
Translation of CN 112063374-A (Year:2020).
Bakar, Green Lost Circulation Material Derived from Orange Peel Waste, Jan. 2011, Universitii Teknologi Petronas (Year:2011).

* cited by examiner

Whole banana

Banana peel

Banana fruit

METHOD OF REMOVING NON-AQUEOUS DRILLING MUD WITH BANANA CONTAINING FLUID

SPECIFICATION

This application is a continuation-in-part of U.S. patent application Ser. No. 17/011,787, filed on Sep. 3, 2020.

Field

The disclosure relates to a method of removing deposits of or residues from oil based or synthetic based drilling mud from a wellbore wall, tubing or casing by introducing into the well a biodegradable aqueous fluid comprising banana.

Background

Drilling fluids (or drilling muds) carry cuttings and other particulates originating during the drilling of subterranean oil and gas wells from beneath the rotary drilling bit, through the annulus and out the well. During drilling, the fluid often remains in contact with open-hole sections within the well and forms a filter cake on the formation and on surfaces of the wellbore. Solids invasion may induce formation damage. The selection of drilling mud has a major effect on minimizing skin development and maximizing oil production.

Drilling muds are normally classified according to their base fluid. Water-based muds are characterized by solid particles suspended in water or brine. Oil can be emulsified in the water, the water being the continuous phase. Oil based muds (OBMs) exist either as all oil-based muds or as invert emulsions characterized by suspended solid particles in the oil phase and water or brine emulsified in the oil or continuous phase. The oil of OBMs typically are petroleum materials including crude oils as well as distilled fractions of crude oil like those produced in conventional refining operations such as diesel, kerosene and mineral oil, as well as heavy petroleum refinery liquid residues. The oil of synthetic based muds (SBMs) is synthesized oil and typically crude oil derivatives that have been chemically treated, altered or refined to enhance chemical or physical properties. Examples of SBMs include linear alpha olefins, isomerized olefins, poly alpha olefins, linear alkyl benzenes and vegetable and hydrocarbon-derived ester compounds. OBMs and SBMs typically form filter cakes composed of colloid particles and water droplets dispersed in an oil phase. Such filter cakes are hydrophobic and exhibit a permeability which is lower than the permeability of the rock.

OBMs and SBMs offer performance advantages over water base fluids. Such advantages include higher penetration rates, improved lubricity, shale stability, decreased fluid loss, deeper bit penetration, and thinner filter-cake characteristics. Furthermore, fluid losses to the formation from OBMs and SMBs tend to be less damaging since the base fluid is oil rather than water.

After drilling is complete, a cleanup or displacement treatment to remove residues left behind by the OBMs and SBMs, including filter cakes, from the formation face is required in order to minimize skin and formation damage, increase production flow and restore the productive zone to a near-natural state. Such cleanup or displacement treatments break down the interfacial rheological properties of the filter cake, wash the damaged zone of the wellbore and restore the formation's fluid transfer properties.

Mud removal or mud displacement procedures are usually performed before cementing. Poor cleaning or removal of OBMs and SBMS from the wellbore or poor displacement of such muds results in solid residues and mud residues left in the wellbore which, in turn, typically lead to formation damage, etc.

Mud residue can further reduce the quality of cement bonding during the cementing operation. Weak bonding between the cement and the formation surface permits undesirable flow of fluids along the wellbore and around the casing as well as undesirable interconnection between separate formation zones once the well is turned to production.

Remedial action for any of the above-mentioned problems, or resulting contamination of a formation interval, can incur substantial costs in both onshore and offshore well operations. Thus, an effective cleanout operation is important to secure establishment of an effective bond between the cement composition and the wellbore wall, tubing, or casing.

Effective clean out fluids often take the role as a spacer fluid. Spacer fluids are introduced into the well prior to a cementitious slurry and separate or displace at least a portion of the drilling mud from an area in the wellbore into which the cementitious slurry is to be emplaced. In some cases, the spacer fluid is capable of removing all of the drilling mud from the well prior to the pumping of the cementitious slurry. In addition to improving displacement efficiency of the drilling mud by separating the mud from a physically incompatible fluid, spacer fluids can further enhance solids removal.

Historically, aqueous-based systems have been used in the removal or displacement of drilling mud, including filter cakes, formed during the drilling operation. Such aqueous systems are typically surfactant-based. Surfactant-based systems are, however, often ineffective. For instance, surfactant-based systems are typically ineffective at breaking the emulsion inside the filter cake and effecting complete phase separation. Further, aqueous surfactant-based treatments often create additional damage by forming an emulsion block with the formation oil. Such emulsion blocks have the potential to block production or injection.

In addition to surfactant-based systems, solvent-based systems have also been used. While strong solvency of the organic solvent toward the base oil in OBMs often exists, organic solvents are generally expensive and often are cost prohibitive. Further, solvent based systems are typically not biodegradable.

There is a need for new clean-out systems that do not cause the problems associated with the aqueous systems of the prior art and which further are biodegradable. Further, there is a need for a spacer fluid which is biodegradable and effective in separating the OBMS from the cement slurry.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY

In an embodiment, the disclosure relates to a biodegradable fluid for use in the clean-up of drilling fluids and which may function as a spacer fluid. The aqueous fluid contains at least one banana as defined herein.

In another embodiment, the disclosure relates to a method of cleaning a wellbore or tubing or casing in a wellbore containing residues and/or deposits of an oil or synthetic based drilling mud. In this embodiment, an aqueous fluid containing banana (as defined herein) is introduced into the wellbore, tubing or casing. The oil and water phases of the oil or synthetic based drilling mud are separated with the aqueous fluid containing (i), (ii), (iii) or (iv). A fluid with entrained drilling mud or residues or deposits of the oil or synthetic based drilling mud is then removed from the wellbore, tubing or casing.

In another embodiment, a method of removing at least a portion of oil-based or synthetic based mud or deposits or residues thereof from a wellbore is provided. In this embodiment, an aqueous fluid containing at least one banana (as defined herein) is introduced into wellbore, after the wellbore has been drilled with the oil-based or synthetic based mud. The oil-based or synthetic-based mud, deposits or residues thereof is then removed from the wellbore.

In another embodiment, a method of removing a filter cake of a drilling mud, deposits or residues thereof from a wellbore is provided wherein a biodegradable aqueous fluid comprising water and banana (as defined herein) is introduced into the wellbore.

BRIEF DESCRIPTION OF THE DRAWINGS

FIG. 1 illustrates the efficiency of an aqueous fluid containing a combination of water and whole banana in the removal of oil-based drilling mud wherein

FIG. 2 illustrates the efficiency of an aqueous fluid in the removal of oil-based drilling mud wherein

DETAILED DESCRIPTION

Figure 1A:
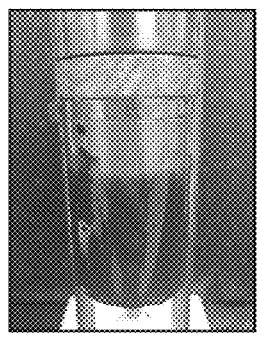
FIG. 1A is a rotor sleeve after rotating in oil-based drilling fluid.

Characteristics and advantages of the present disclosure and additional features and benefits will be readily apparent to those skilled in the art upon consideration of the following detailed description of exemplary embodiments of the present disclosure and referring to the accompanying figure. It should be understood that the description herein, being of exemplary embodiments, are not intended to limit the claims. On the contrary, the intention is to cover all modifications, equivalents and alternatives falling within the spirit and scope of the claims. Changes may be made to the particular embodiments and details disclosed herein without departing from such spirit and scope.

As used herein, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . " Further, reference herein and in the appended claims to components and aspects in a singular tense does not necessarily limit the present disclosure or appended claims to only one such component or aspect, but should be interpreted generally to mean one or more, as may be suitable and desirable in each particular instance.

All ranges disclosed herein are inclusive of the endpoints. Unless stated otherwise, any range of values within the endpoints is encompassed. For example, where the endpoints of a range are stated to be from 1 to 10, any range of values, such as from 2 to 6 or from 3 to 5 will be defined by the range. The suffix "(s)" as used herein is intended to include both the singular and the plural of the term that it modifies, thereby including at least one of that term. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context.

The term "tubing" as used herein shall refer to any surface to which drilling mud is in contact during the transport of drilling mud, oil or gas from the well to the surface. It shall include liners, coiled tubing, tubing string, etc.

As used herein, the term "drilling fluid" or "drilling mud" further encompasses drill-in fluids.

The word "banana" (unless stated to the contrary) shall refer to (i) the peel (or skin) of a banana; (ii) the edible fruit portion of banana (encased by the peel); (iii) a mixture of (i) and (ii); or (iv) a combination of whole banana (which includes the peel as well as the edible portion of the fruit) and (i), (ii) or (iii). The banana may be ripened or unripened, preferably ripened. The banana may be harvested from banana plants or trees.

The aqueous fluid disclosed herein may be referred to as a cleaning fluid or a displacement fluid for use in removing or displacing OBMs and SBMs (including deposits, such as filter cakes, and residues thereof) from wellbore walls, tubings and casings.

The aqueous fluid fluidly contacts a portion of the tubular exterior surface and a portion of the wellbore wall of the annulus. The aqueous fluid contacting the surfaces makes both surfaces water-wet and induces circulation of flow of the drilling mud in the wellbore and into the wellbore annulus.

In an embodiment, the aqueous fluid displaces SBMs and OBMs from the annulus and casing as well. In addition, the aqueous fluid increases the production of hydrocarbons from oil and gas wells. The well may be a horizontal, vertical or deviated well.

The aqueous fluid is highly efficacious in breaking down the interfacial rheological properties of OBM and SBM mud cakes for diversified drilling mud systems. In an embodiment, the aqueous fluid separates the OBM or SBM into its component phases by breaking (demulsifying) the emulsion inside the filter cake. For example, the aqueous fluid is capable of flocculating water droplets of the mud systems. During flocculation, the droplets clump together forming aggregates or flocs. Water droplets fuse to form larger drops during coalescence. This leads to complete phase separation (oil and water) and emulsion breaking. Filter cake cohesion and wellbore adherence of the mud decreases.

The efficiency of the aqueous fluid is evidenced by the high percentage of filter cake removal. The amount of filter cake and residual mud removed from the well from a single treatment is typically higher than 80% and more typically in excess of 90%.

The fluid comprises water and banana. The banana may be combined with the water in its natural physical state or may be pulverized or fragmented when added to water. Typically, the banana is combined with the water and the combination then subjected to mixing or shear.

The aqueous fluid system may or may not require a surfactant and does or does not form an emulsion.

The fluid systems are biodegradable and exhibit very low, if any, toxicity to the environment and aquatic organisms (including those low in the food chain). Thus, the fluid systems are environmentally friendly and, while exhibiting superior excellent cleaning performance, demonstrate a clear eco-toxicological advantage over conventional cleaning fluids.

The aqueous fluid may be supplied in a concentrate form and then admixed with water before use. In an embodiment, the concentrate may be admixed with up to about 90 weight percent water prior to use. Typically, when introduced into the well, the fluid contains a weight ratio of banana (as defined herein) to water between from about of from about 1:10 to about 10:1, more typically from about 1:5 to about 5:1. In a preferred embodiment, the weight ratio of banana to water is about 1:1.

When the banana constitutes a mixture of (i) and (ii), the weight ratio of (i) to (ii) is from about 1:99 to about 99:1. When the banana constitutes the combination of (i) or (ii) to whole banana, the weight ratio of (i) or (ii) to whole banana is from about 1:99 to about 99:1. When the banana constitutes a combination of whole banana and the mixture of (i) and (ii), the weight ratio of whole banana to the mixture is from about 1:99 to about 99:1, the amount of (i) and (ii) in the mixture being as previously stated.

In an embodiment, a most efficient aqueous fluid pumped into the wellbore is one wherein the amount of banana (as defined herein) in the fluid is from about 0.5 to 20% by weight, preferably from 1 to 10% by weight, more preferably from 3 to 8% by weight of the aqueous fluid. Prior to being introduced into the well, a viscosifying agent (as referenced herein as well as other conventional additives) may be added to the fluid.

The water of the aqueous fluid may be hard or soft, and may be fresh water or salt water. Sea water may be used in those instances where the supply of fresh water is limited. Brines may also be used to dilute a concentrate before introduction into the well.

In an embodiment, a concentrate of the fluid may be shipped to its destination and then admixed with water to the desired ratios. Such admixing may occur on the fly.

In another embodiment, a concentrated form of the banana may be injected into the well and diluted in situ in an aqueous fluid present in the wellbore, tubing or casing.

The aqueous fluid is stable over a relatively wide range of temperatures (typically up to 300° F. or higher), is tolerant of both caustic and acidic fluids and further is tolerant over a relatively wide range of fluid salinity. This is important since fluid remaining in the wellbore after completion of the drilling and casing process may contain a significant amount of brine.

Typically, the pH of the aqueous fluid pumped into the well is neutral, typically from about 6.0 to about 10.0.

The breaking down of the OBM or SBM and the cleaning efficiency of the fluid may be enhanced when the aqueous fluid is subjected to either laminar or turbulent flow conditions.

In addition to enhancing the removal of residues of OBMs and SBMs from the well, the aqueous fluid may be used as a displacement or spacer fluid to separate the mud from a physically incompatible cementitious slurry. In this embodiment, the spacer fluid may be introduced into the wellbore having a first fluid (drilling mud) disposed therein. A second fluid (cementitious slurry) may be introduced into the wellbore with the spacer fluid separating the first fluid and the second fluid.

In a preferred operation, the spacer fluid may be pumped down the wellbore and up through the annulus between the casing and the formation face to remove or displace at least a portion of the drilling mud from the wellbore and into the annulus.

Introduction of the aqueous fluid into the wellbore may occur through a first fluid conduit at a pressure adequate to induce laminar or turbulent fluid circulation such that an equivalent amount of wellbore fluid (mud) is displaced through a second fluid conduit. Here, the wellbore annulus forms between the external surface of the tubular (having the internal fluid conduit and an external surface) and the wellbore wall. The internal fluid conduit fluidly couples the surface with the wellbore. After the mud has been displaced by the aqueous fluid, a water-based cement slurry may be introduced into the conduit and the slurry cured. (In some instances, the cement slurry may be followed by an additional volume of the spacer fluid.) The spacer fluid is introduced into the wellbore in an amount sufficient to separate the drilling mud from the cement slurry. As the spacer fluid is circulated through the wellbore, it mixes with the drilling mud. Before the drilling mud is completely removed from the area to be cemented, there may be some mixing of the drilling mud, spacer fluid and cement slurry. However, the spacer fluid will not harden, gelatinize or otherwise become immobile because of the commingling of the three components. The cured cement is separated from the mud by the aqueous or space fluid; the spacer fluid isolating at least a portion of the wellbore annulus containing the drilling mud from the aqueous cement slurry.

In an embodiment, positioning the aqueous slurry in the wellbore annulus occurs such that the cement slurry contacts both the tubular external surface and the wellbore wall. Maintaining the position of the aqueous cement slurry permits the cement to adhere to the water-wet surfaces of the wellbore wall and tubular exterior. It also permits the wellbore conditions to induce curing in the cement. Upon curing, the aqueous cement slurry forms a solid cement material in the wellbore annulus, fluidly isolating at least a portion of the wellbore annulus.

Ideally, the spacer fluid removes all of the drilling mud, dehydrated/gelled drilling mud and residues therefor (including filter cakes) from the well prior to the pumping of the cementitious slurry. Where this is not the case, and the drilling mud and aqueous cement slurry are not compatible with each other, the aqueous fluid as a displacement or spacer fluid serves to separate or prevent contact between them and to remove the drilling mud from the area in which the cement slurry is to be emplaced. Negative direct interaction between the drilling mud (the first fluid) and the cementitious slurry is avoided. Cementing in the presence of filter cake can cause a cementing job to fail. The adhesion of filter cake and gelled fluid to the well bore wall or the tubular exterior is weak compared to the bond that cement can make. Cementing on top of filter cake strips the cake off the walls and exterior surfaces due to the weight of the cement upon curing. This lack of direct adhesion creates fluid gaps in and permits circulation through the well bore annulus. Thus, the spacer fluid defined herein may be used to remove such composition.

The cement of the cement slurry may be any conventional cement used in the art in the cementing of wells. Such cements include those comprising calcium, aluminum, silicon, oxygen, iron, and/or sulfur, which set and harden by reaction with water as well as hydraulic cements such as Portland cements, pozzolan cements, gypsum cements, high alumina content cements, slag cements, silica cements as well as combinations thereof.

The aqueous fluid as spacer fluid may also be useful for separating different drilling muds during drilling mud change outs and for separating a drilling mud and an aqueous fluid (including a completion brine or seawater) during well integrity testing. In some instances, the aqueous fluid may water-wet surfaces of the wellbore to promote bonding of the cement sheath to the wellbore and casing.

The efficiency of the aqueous fluid as a spacer fluid is improved by the fluid being compatible at downhole temperatures and pressures with both OBM and SBM muds as well as cementitious slurries.

The aqueous fluid may further include a viscosifying agent as rheology modifier. The aqueous fluid may be formed by blending the viscosifying agent (and any of the components referenced herein) into the aqueous fluid containing the banana. Blending means can include mixing using a low- or high-shear blender; batch mixing of the components may proceed until homogeneous incorporation and formation of the fluid is obtained. The aqueous fluid may be prepared on the fly.

The viscosifying agent may induce thickening of the fluid to enable particle suspension and provide salinity and long-term fluidity to the fluid. The enhanced stability enables the aqueous fluid to be used at elevated bottom hole temperatures. In an embodiment, the aqueous fluid is stable and may be used at a bottom hole temperature up to 300° F. and higher. In another embodiment, the fluid is stable and may be used at a bottom hole temperature of up to 400° F. and higher. The viscosifying agent may further assist in the prevention of losses of the aqueous fluid into the formation.

In an embodiment, the viscosifying agent may be added to the aqueous fluid containing the banana or the banana may be added to a fluid already viscosified by the viscosifying agent.

The viscosifying agent may be included in the aqueous fluid in an amount sufficient to provide, for example, the desired rheological properties. Typically, the amount of viscosifying agent in the aqueous fluid is between from between 0 to about 50 weight percent of the total weight of the aqueous fluid, preferably no more than about 20 or 30 pounds per 1,000 gallons of water.

The viscosifying agent may be a phosphomannnan, dextran, starch, starch derivative, polysaccharides, such as xanthan, derivatized xanthan, welan gums, locust bean gum, karaya gum, diutan, galactomannan gums, cellulose gums, corn, potato, wheat, maize, rice, cassava, and other food starches, cornstarch, hydroxyethyl cornstarch, hydroxypropyl cornstarch, succinoglycan, scleroglucan and carrageenan and combinations thereof The viscosifying agent may further be a synthetic polymer such as a polyvinyl alcohol or an ammonium or alkali metal salt of an acrylamidomethylpropanesulfonic acid as well as combinations thereof.

Preferred cellulosic derivatives include hydroxyethyl cellulose, hydroxypropyl cellulose, carboxymethylhydroxyethyl cellulose, ethylhydroxyethyl cellulose, ethylmethylhydroxyethyl cellulose, hydroxypropyl methyl cellulose, hydroxyethylpropyl cellulose, dialkyl carboxymethyl cellulose, and carboxymethyl cellulose, alkyl celluloses such as methyl cellulose and combinations thereof. Hydroxyethyl cellulose is especially preferred.

Galactomannan gums include underivatized guar as well as derivatized guars like hydroxypropyl guar (HPG), carboxymethyl hydroxypropyl guar (CMHPG).

The viscosifying agent may be crosslinkable or non-crosslinkable and may be considered as a thickening polymer which is hydratable to form a linear or crosslinked gel.

The density of the aqueous fluid may be dependent upon well conditions, most specifically, the density of the mud in the wellbore at the time of cementation. It is preferable, but not essential, that the fluid introduced into the wellbore have a density at least equal to or greater than the density of the drilling mud and, when used as a spacer fluid, less than or equal to the density of the cementitious slurry to be introduced into the wellbore. The higher density spacer fluid pushes gelled and solid remnants of the displaced fluid away from the wellbore wall and fluid conduit exteriors.

In an embodiment, the aqueous fluid may be characterized by a density ranging from about 8 to about 24 lb/gal, more preferably from about 14 to about 20 lb/gal, and most preferably about 16 to 20 lb/gal.

The aqueous fluid may contain one or more weighting agents to increase the density of the fluid. For instance, when used as a spacer fluid, the weighting agent may increase the density profile between the fluids it is separating and to prevent fluid inversion with other fluids in the wellbore. The weighting agent is employed in an amount sufficient to provide the desired density to the aqueous fluid. Typically, the weighting agent is present in the aqueous fluid in a range of from about 100 pounds to about 400 pounds per barrel of base aqueous fluid. The weighting agent also assists with increasing the buoyancy effect of the aqueous fluid on gelled drilling muds and filter cake. The weighting agent may be part of the aqueous fluid introduced into the wellbore or may be applied subsequent to the introduction of the aqueous fluid into the wellbore.

Weighting agents that can be utilized are preferably insoluble in water and liquid hydrocarbons and include sand, barite, hematite, fly ash, calcium carbonate, silica sand, illmanite, manganese oxide, trimanganese tetraoxide, iron oxide, and fly ash and the like. Barite is especially preferred.

The aqueous fluid may contain one or more other components to secondarily supplement desirable properties of the fluid. When present, the amount of any of such components may be in the range of from about 0.05% to about 1%, more typically between about 0.2 and about 0.5%, and most typically about 0.3%, by weight.

For instance, the aqueous fluid may contain an antifoaming agent to reduce surface tension and prevent the formation of foams and emulsions from forming between the aqueous spacer fluid and hydrocarbons in the drilling mud and in the wellbore interior. Suitable antifoaming agents may include polysiloxanes, paraffinic oils, mineral oils, vegetable oils as well as combinations thereof.

The aqueous fluid may contain a suspension agent in order to maintain the fluid with minimal separation over time and to impart the requisite viscosity to the fluid to allow weighting particles to remain suspended over a period of time. Typically, the suspension agent is hydrated in water for a time sufficient to obtain the desired viscosity of the solution. Suitable suspending agents may include starch, succinoglycan, polyethylene oxide, oil in water emulsions created with paraffin oil, carrageenan, etc.

Further, the spacer fluid may contain a thinning agent for reducing flow resistance and gel development by reducing viscosity of the aqueous fluid. For instance, the thinning agent may reduce the flow resistance and gel development of a filter cake. Functional groups on the thinning agents may act to emulsify oils and hydrocarbons present in the aqueous phase. Thinning agents may also be used in the aqueous fluid to attract solids and particles and disperse such particles; the dispersion of particles preventing any increase in viscosity of the spacer fluid due to aggregation. The thinning agent may further interact with charged particles in the wellbore fluid to suspend them for removal from the wellbore. Thinning agents, which are ionic, can further counter-act the effects of cement slurry intrusion into the aqueous fluid. (Cement intrusion in the spacer fluid composition can result in greater saline concentration or higher pH, which in turn can cause the gel strength or the yield point value, or both, of the spacer fluid to rise.) Suitable thinning agents include tannins, lignins, and humic acids, In some instance, a salt may be added to the fluid to reduce the amount of water needed and also lowers the freezing point of the aqueous fluid. Among the salts that may be added are NaCl, KCl, $CaCl_2$, and $MgCl_2$. Other suitable salts can be formed from K, Na, Br, Cr, Cs and Bi metals.

A wide variety of additional additives may also be included in the aqueous fluid as deemed appropriate by one skilled in the art, with the benefit of this disclosure. Examples of such additives include free water control additives, fluid loss control additives, lost circulation materials, filtration control additives, dispersants, defoamers, corrosion inhibitors, anti-microbial inhibitors, anti-foaming agents, scale inhibitors, formation conditioning agents, etc.

EXAMPLES

All percentages set forth in the Examples are given in terms of volume units except as may otherwise be indicated.

Example 1. A rotor test was conducted at ambient temperature to compare conventional spacer fluids with a biodegradable aqueous fluid containing whole banana. The banana containing fluid consisted of about 100 g of whole banana and 100 g of water. The comparative fluids were a Surfactant wash (base line) having a 50:50 weight ratio of water and spacer surfactant. A second fluid ("Surfactant wash with LCM 1") containing the Surfactant wash and 2 percent by weight of a commercial fibrous loss circulation material (LCM 1). A third fluid ("Surfactant wash with LCM 2") containing the Surfactant wash and 2 percent by weight of a commercial loss circulation material (LCM 2).

Figure 1B:
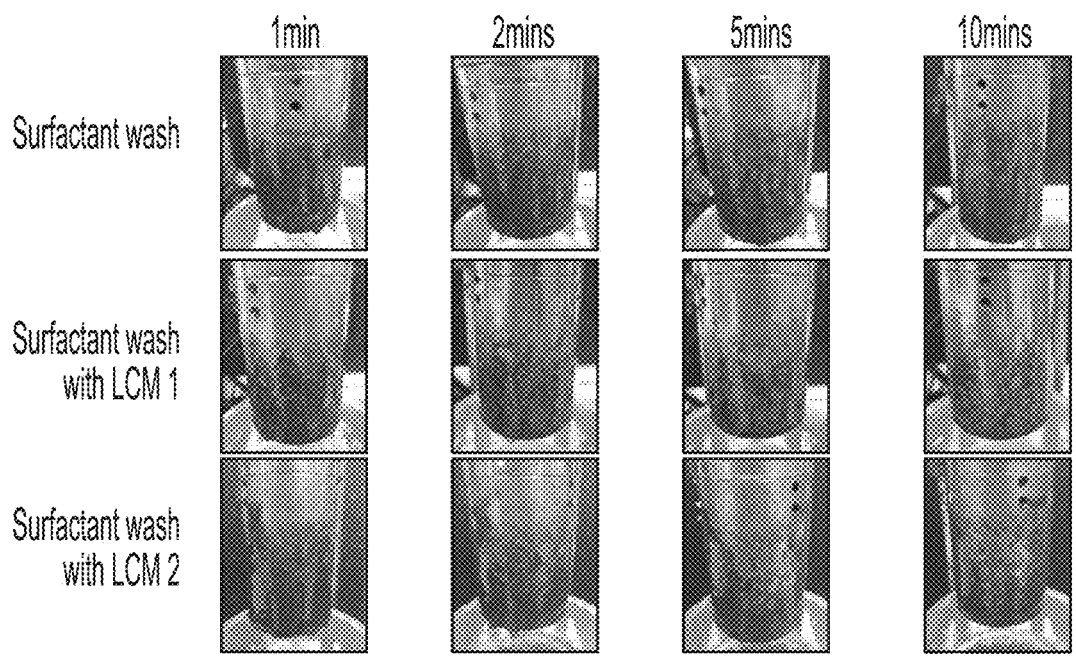
FIG. 1B shows prior art surfactant washes and FIG. 1C is the aqueous banana-containing fluid.
Figure 1C:
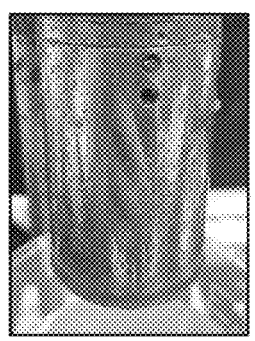

The rotor test for determining water-wetting of the fluid was undertaken by first loading the oil-based drilling fluid into a rheology cup. The cup was then placed on the base and raised upward slowly until the drilling fluid was even with the line inscribed on the outer surface of the rotary sleeve. The cup was then rotated at 100 rpm for about 5 minutes. The sleeve after rotating in the oil-based drilling fluid is shown in FIG. 1A. The drilling fluid cup was then removed and excess fluid was allowed to drip from the sleeve. The test fluid was then loaded into a clean rheology cup. The cup was placed on the base and raised upward slowly until the fluid was even with the line inscribed on the outer surface of the rotary sleeve. The cup was then rotated at 100 rpm in 1, 2, 5 and 10 minute intervals. The cup was then removed and visually observed and the cleanliness of the sleeve was then recorded. The water was then loaded into a clean rheology cup. The cup was then placed on the base and raised upward slowly until the water was even with the line inscribed on the outer surface of the rotary sleeve. The cup was then rotated at 100 rpm for about 5 minutes. The cup was removed and visually observed. The cleanliness of the sleeve was then recorded. The results for the Surfactant wash, Surfactant wash with LCM 1 and Surfactant wash with LCM 2 are shown in FIG. 1B. The sleeve after rotating in the combination of whole banana and water after 1 minute is shown in FIG. 1C. As illustrated in FIG. 1C, the banana combination was shown to be more efficient within one minute versus the 10 minutes of the commercial spacer packages. As illustrated, the aqueous fluid containing combination was almost 90% visibly more efficient than the commercial spacer packages.

Figure 2A:
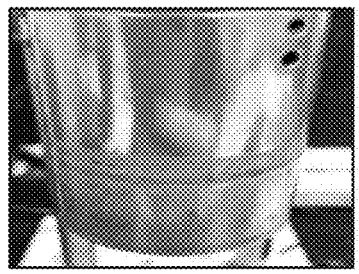
FIG. 2A is a fluid containing a combination of water and whole banana.
Figure 2B:
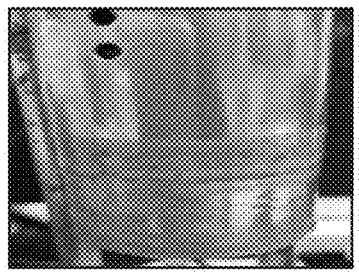
FIG. 2B is a fluid containing a combination of banana peel and water and FIG. 2C is a fluid containing a combination of banana fruit and water.
Figure 2C:
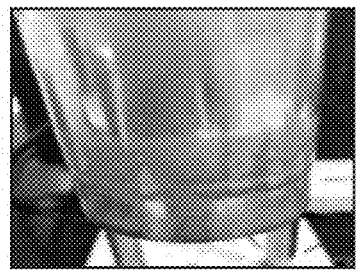

Example 2. The rotor test as described in Example 1 was repeated using (i) a first fluid containing about 100 g of whole banana and about 100 g of water; (ii) a second fluid containing about 100 g banana peel (only) and about 100 g of water; and (iii) a third fluid containing about 100 g of banana fruit (only) and 100 g of water. The sleeve after rotating the three mixtures of fluid after 1 minute are shown in FIG. 2A, FIG. 2B and FIG. 2C. As illustrated, the fluids (i), (ii) and (iii) were shown to be more efficient within one minute versus the 10 minutes when using the commercial spacer package.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

What is claimed is:

1. A method of cleaning a wellbore or tubing or casing in a wellbore containing residues and/or deposits of an oil or synthetic based drilling mud, the method comprising:
   (A) introducing into the wellbore, tubing or casing an aqueous fluid containing:
   (i) a peel of a banana;
   (ii) edible fruit portion of a banana;
   (iii) a mixture of (i) and (ii); or
   (iv) whole banana and a combination of either (i), (ii) or (iii)
   wherein the weight ratio of (i), (ii), (iii) or (iv) to water in the aqueous fluid is from about 1:10 to about 10:1;
   (B) separating oil and water phases of the oil or synthetic based drilling mud with the aqueous fluid containing (i), (ii), (iii) or (iv); and
   (C) removing from the wellbore, tubing or casing fluid having residues or deposits of the oil or synthetic based drilling mud entrained therein.

2. The method of claim 1, further comprising introducing into the wellbore, tubing or casing a cementitious slurry and displacing at least a portion of the drilling mud, drilling mud deposits or drilling mud residues.

3. The method of claim 1, wherein the aqueous fluid containing (i), (ii), (iii) or (iv) further comprises a weighting agent.

4. The method of claim 1, wherein the density of the aqueous fluid containing (i), (ii), (iii) or (iv) is from about 8 to about 24 lb/gal.

5. The method of claim 1, wherein the aqueous fluid containing (i), (ii), (iii) or (iv) introduced into the wellbore, tubing or casing is diluted from a concentrate.

6. The method of claim 5, wherein the concentrate is diluted on the fly.

7. The method of claim 1, wherein the weight ratio of the total of (i), (ii), (iii) or (iv) to water in the aqueous fluid is from about 1:5 to about 5:1.

8. The method of claim 7, wherein the weight ratio of the total of (i), (ii), (iii) or (iv) to water in the aqueous fluid is 1:1.

9. The method of claim 1, wherein the bottom hole temperature within the wellbore is up to 400° F.

10. The method of claim 9, wherein the bottom hole temperature within the wellbore is up to 300° F.

11. A method of removing at least a portion of oil-based or synthetic based mud or deposits or residues thereof from a wellbore comprising:
   (a) introducing into the wellbore a concentrate of either
      (i) a peel of a banana;
      (ii) edible fruit portion of a banana;
      (iii) a mixture of (i) and (ii); or
      (iv) whole banana and a combination of either (i), (ii) or (iii)
   (b) diluting the concentrate in-situ in the wellbore in an aqueous fluid present in the wellbore after the wellbore has been drilled with the oil-based or synthetic based mud, wherein the weight ratio of (i), (ii), (iii) or (iv) to water, after dilution, is from about 1:10 to about 10:1;
   (c) separating oil and water phases of the oil or synthetic based drilling mud with the aqueous fluid comprising (i), (ii), (iii) or (iv); and
   (d) removing the oil or synthetic based mud, deposits or residues from the wellbore.

12. The method of claim 11, wherein the weight ratio of (i), (ii), (iii) or (iv) to water, after dilution, is from about 1:5 to about 5:1.

13. A method of removing a filter cake of a drilling mud, deposits or residues thereof from a wellbore comprising:
   (A) introducing an aqueous fluid into the wellbore after the filter cake has formed, the aqueous fluid comprising water and either:
      (i) a peel of a banana;
      (ii) edible fruit portion of a banana;
      (iii) a mixture of (i) and (ii); or (iv) whole banana and a combination of either (i), (ii) or (iii) wherein the weight ratio of (i), (ii), (iii) or (iv) to water in the aqueous fluid is from about 1:10 to about 10:1; and
   (B) decreasing cohesion of the previously formed filter cake with the aqueous fluid.

14. The method of claim 13, wherein the weight ratio of the total of (i), (ii), (iii) or (iv) to water in the aqueous fluid is from about 1:5 to about 5:1.

15. The method of claim 14, wherein the weight ratio of the total of (i), (ii), (iii) or (iv) to water in the aqueous fluid is 1:1.

16. The method of claim 13, wherein the drilling mud is an invert emulsion and further wherein the aqueous fluid demulsifies the emulsion.

17. The method of claim 13, wherein prior to step (a), diluting a concentrate of fluid containing either (i), (ii), (iii) or (iv) to form the aqueous fluid.

18. The method of claim 13, wherein the bottom hole temperature within the wellbore is up to 400° F.

19. The method of claim 18, wherein the bottom hole temperature within the wellbore is up to 300° F.

20. The method of claim 13, further comprising separating oil and water from the drilling mud, deposits or residues by coalescing flocculated water droplets from the filter cake.

* * * * *